Figure 1:
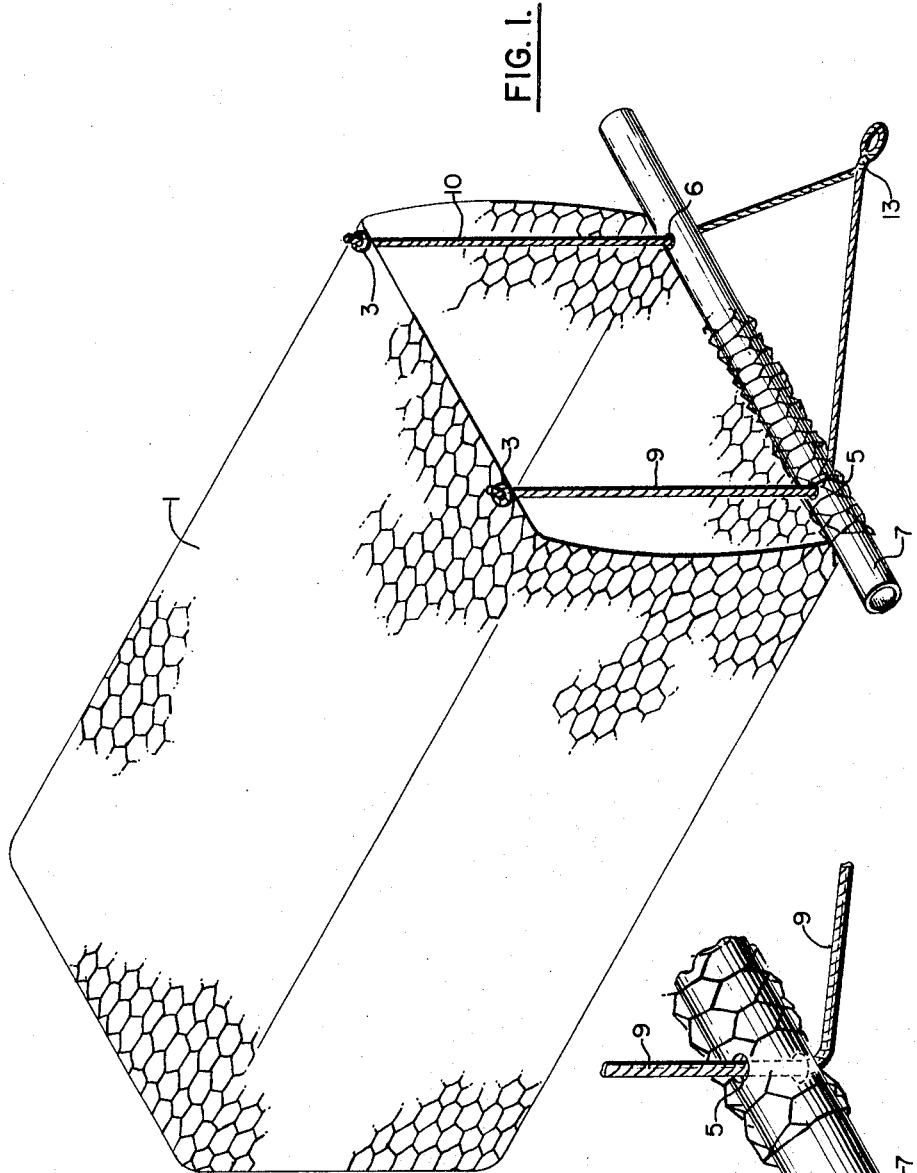

United States Patent
Rea

[11] 3,800,465
[45] Apr. 2, 1974

[54] FISH AND CRAB TRAP

[76] Inventor: Harry E. Rea, 4667 Camelot Dr., New Orleans, La. 70127

[22] Filed: May 1, 1973

[21] Appl. No.: 356,090

[52] U.S. Cl. ................................................. 43/105
[51] Int. Cl. ........................................... A01k 69/10
[58] Field of Search ........... 43/105, 102, 100, 9, 6.5

[56] References Cited
UNITED STATES PATENTS

| 1,161,186 | 11/1915 | Butcher | 43/105 |
| 1,959,793 | 5/1934 | LaFredo et al. | 43/9 |

Primary Examiner—Warner H. Camp
Attorney, Agent, or Firm—Ray & Spielman

[57] ABSTRACT

A basket means has a resilient mouth, cable means is attached to the basket near the mouth, and an anchor means likewise is attached to the basket near the mouth but substantially opposite the cable attachments. The cable means traverses the mouth and is loosely threaded through apertures in the anchor means.

6 Claims, 5 Drawing Figures

FISH AND CRAB TRAP

BACKGROUND OF THE INVENTION

Obtainment of fish and crustaceans such as crabs, crayfish, etc., has long been accomplished by the utilization of traps. Very simple traps have been devised which usually comprise a basket and an inwardly directed funnel. These simple traps, however, though somewhat effective in capturing the desired prey, present difficulty in removing the caught prey and are not especially effective in that entrance for the prey must be made through a restricted funnel opening.

More complicated traps which attempt to alleviate the above removal and restriction problems have been developed. See for example, U.S. Pat. No. 2,787,861, U.S. Pat. No. 2,821,047, U.S. Pat. No. 2,918,749 and U.S. Pat. No. 1,143,758. While these traps facilitate ease of removal of the captured prey and do not present constricted openings through which the prey must pass, their construction is highly complicated and overly expensive.

Therefore it is an object of this invention to provide a fish or crustacean trap which has a large entrance thereto and which facilitates ease of removal of the captured fish, etc., all without the need of complicated and expensive construction.

THE INVENTION

This invention relates to a fish and crustacean trap comprising a basket means having a mouth defined by resilient material, an anchor means connected to said basket means adjacent to said mouth and a cable means attached to said basket means adjacent to said mouth and substantially opposite said anchor means, said cable means traversing said mouth and passing through aperture means in said anchor means whereby a pulling force on the passed portion of said cable means closes said mouth.

The basket portion of the trap of this invention may be made entirely of resilient material, or it may be made of rigid material with only the mouth portion thereof being resilient. Generally speaking, any resilient meshed material is suitable for the trap of this invention. Common chicken wire is especially suitable. The shape of the basket is not critical, with square, rectangular and cylindrical shapes all being serviceable. A preferred shape is a rectangular shape.

The anchor attached to the resilient mouth of the trap of this invention should be of a solid material which will aid in sinking of the trap. Metals are especially preferred with corrosion resistant metals being most preferred. Attaching the anchor to the basket at or near its mouth can be achieved by any of those ways well-known to those skilled in the art for making such attachments, e.g., tying the anchor to the basket with wire.

The shape of the anchor is preferably rectangular or cylindrical. The anchor length should be that minimum length which will provide for passage of the cables around or through the anchor (such passage is hereinafter described). A preferred length is one which is substantially equal to the width of the basket.

The cables which are attached to the basket adjacent to the resilient mouth are substantially opposite the anchor. The cables extend from the point of attachment so as to traverse the mouth of the trap and to pass through apertures in the anchor. The number of cables utilized is not critical, with one cable being sufficient and two cables being preferred. The number of apertures required in the anchor is, of course, dependent upon the number of cables used; e.g., one aperture for one cable and two apertures for two cables. It is to be understood that the cables need not pass necessarily through apertures in the anchor means but that they may pass, as an alternative, around and back of the anchor without loss of functionality. By having the cables pass through apertures or around and back of the anchor it is possible to exert a pulling force on the cable which will close the mouth of the trap.

The cable ends opposite the attached ends are generally tied to a retrieving line. The retrieving line is utilized by the fisherman for pulling up the trap from the water. As can be seen when the retrieving line is pulled the cables are likewise pulled, thus closing the trap and capturing any prey which has gone after bait placed therein. Also, due to the unique design of the trap of this invention, the closing mouth is the first portion of the trap which rises to the surface of the water when the retrieving line is pulled. This feature is important as it lessens escape from the trap of the prey as such prey generally will seek that portion of the trap which is in the deepest water, i.e., the back portion of the trap furtherest from the mouth.

The cables used for the purpose of this invention can be of natural or synthetic fiber or can be wire. Attaching the cables to the trap can be accomplished by the simple mode of tying.

Figure 2:
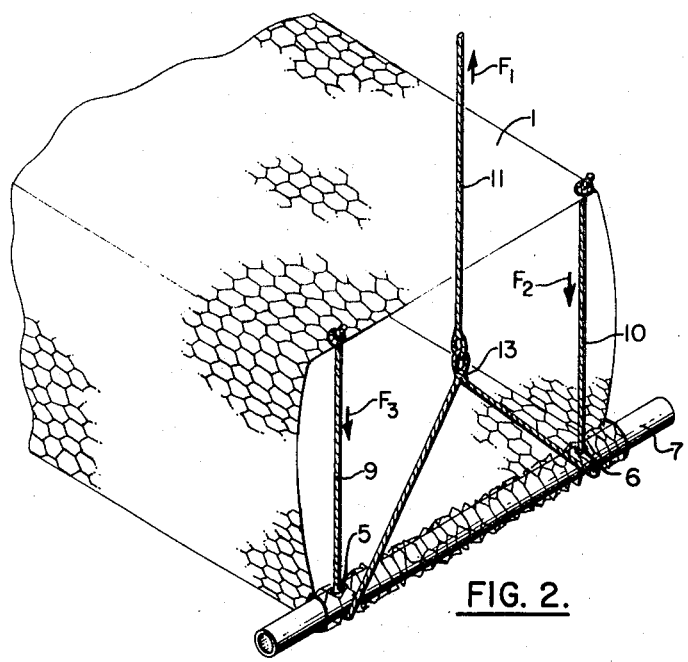
Figure 3:
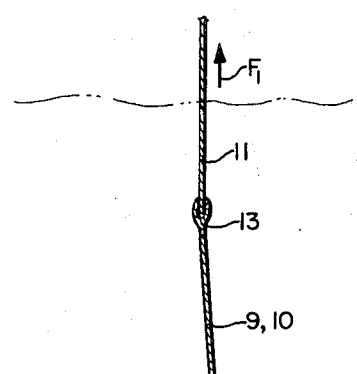
Figure 3:
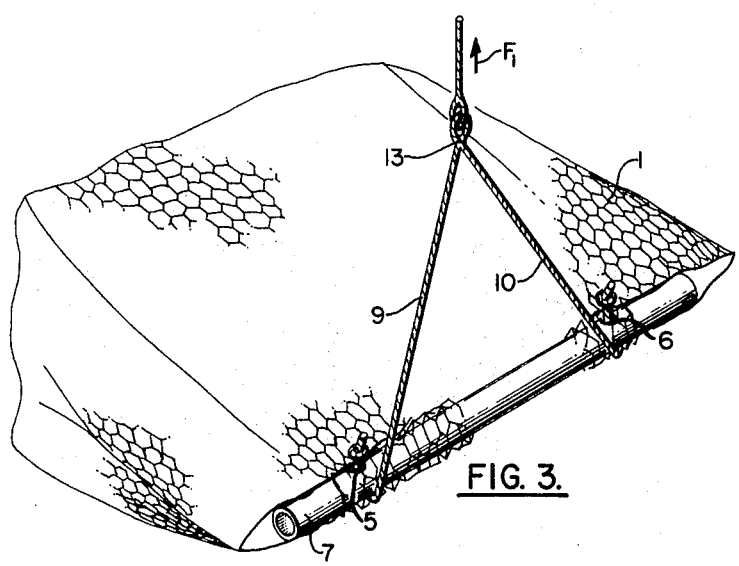
Figure 4:
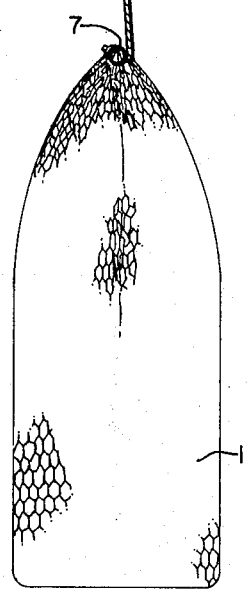

These and other features of the invention contributing satisfaction in use and economy in manufacture will be more fully understood from the following descriptions of preferred embodiments of the invention when taken in connection with the accompanying drawings, wherein identical numbers refer to identical parts and in which FIG. 1 is a perspective view of a trap of this invention; FIGS. 2 and 3 are perspective fragmentary views of the trap of FIG. 1 as used; FIG. 4 is a side plane view of the trap of FIG. 1 in a closed position; and FIG. 5 is a fragmentary perspective view detailing the anchor means shown in FIG. 1.

As can be seen from FIGS. 1-3, basket 1 is of resilient material, i.e., chicken wire and has attached to the bottom thereof and adjacent to the mouth a cylindrical anchor 7. Attached to the upper portion of the mouth of basket 1 are cables 9 and 10. Cables 9 and 10 are attached at 3 by tying. Cables 9 and 10 pass through apertures 5 and 6 in anchor 7. A knot forming a loop 13 joins cables 9 and 10.

Figure 5:
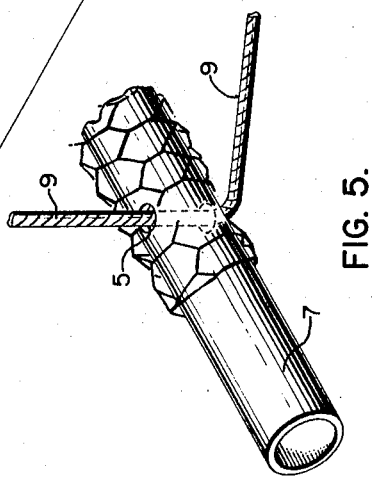

FIG. 5 details aperture 5 and anchor 7 through which cable 9 passes. As can be seen from this detail, cable 9 can slip easily through aperture 5 upon exertion of a pulling force on cable 9.

FIGS. 2 and 3 show the trap in operation. It can be seen from these figures that force $F_1$ exerted upon retrieving line 11 which is connected to cables 9 and 10 exerts force $F_2$ and $F_3$ on the upper portion of the mouth of basket 1. The result of these forces is shown in FIG. 3 which shows the mouth of the basket 1 in a collapsed and closed position.

FIG. 4 shows the trap in a closed position as it is lifted from the water bed by retrieving line 11.

What is claimed is:

1. A trap comprising:

a. a basket means having a mouth of resilient material;
b. an anchor means connected to said basket means adjacent to said mouth; and
c. a cable means attached to said basket means adjacent to said mouth and substantially opposite said anchor means, said cable means traversing said mouth and passing through aperture means in said anchor means.

2. The trap of claim 1 wherein said anchor means has a length substantially equal to the width of said trap.

3. The trap of claim 1 wherein said basket means is a wire mesh basket.

4. The trap of claim 1 wherein said cable means is two cables and wherein said aperture means is two apertures.

5. The trap of claim 1 wherein said anchor means is cylindrical.

6. The trap of claim 1 wherein said anchor means is cylindrical and has a length substantially equal to the width of said trap, said basket means is a wire mesh basket, said cable means is two cables, and said aperture means is two apertures.

* * * * *